United States Patent

Wang et al.

[11] Patent Number: 5,521,366
[45] Date of Patent: May 28, 1996

[54] DATAFORM READERS HAVING CONTROLLED AND OVERLAPPED EXPOSURE INTEGRATION PERIODS

[75] Inventors: Ynjiun P. Wang; Paul P. Ju, both of Fort Myers, Fla.

[73] Assignee: Metanetics Corporation, Fort Myers, Fla.

[21] Appl. No.: 332,592

[22] Filed: Oct. 31, 1994

Related U.S. Application Data

[63] Continuation-in-part of Ser. No. 280,489, Jul. 26, 1994.

[51] Int. Cl.$^6$ .................................................. G06K 7/10
[52] U.S. Cl. ................................................ 235/454; 235/472
[58] Field of Search .................................. 348/294, 297, 348/221, 296, 362, 231; 235/436, 454, 455, 472; 250/208.1

[56] References Cited

U.S. PATENT DOCUMENTS

| | | | |
|---|---|---|---|
| 4,835,615 | 5/1989 | Taniguchi et al. | 358/213.19 |
| 4,952,966 | 8/1990 | Ishida et al. | 348/497 X |
| 4,996,413 | 2/1991 | McDaniel et al. | 250/208.1 |
| 5,025,319 | 6/1991 | Mutoh et al. | 358/213.29 |
| 5,262,871 | 11/1993 | Wilder et al. | 358/213 |
| 5,272,538 | 12/1993 | Homma et al. | 358/228 |
| 5,309,243 | 5/1994 | Tsai | 348/221 |
| 5,345,266 | 9/1994 | Denyer | 348/300 |
| 5,352,884 | 10/1994 | Petrick et al. | 250/208.1 |

FOREIGN PATENT DOCUMENTS 0067692 3/1988 Japan .................................... 235/462

Primary Examiner—Donald T. Hajec
Assistant Examiner—Thien Minh Le
Attorney, Agent, or Firm—Kenneth P. Robinson

[57] ABSTRACT

Dataform readers and methods provide operation with a sequence of overlapping exposure periods for successive lines of sensor elements of an array. Also, the exposure periods for successive lines of sensor elements, or successive subsets of lines, can be independently determined. In operation of a dataform reader illumination of a target area is turned on before exposure of the first line of sensor elements, each line of sensor elements is exposed by reflected illumination in an exposure period which overlaps with the exposure period of one or more other lines, and illumination is then turned off. Using a CMOS construction, for example, the level of image signals read from one line of sensor elements is referred to a look-up table to determine an appropriate exposure period for a subsequent line or lines of elements of an array. This process is repeated to achieve exposure periods adjusted for localized exposure conditions for each successive line or subset of lines of sensor elements.

35 Claims, 7 Drawing Sheets

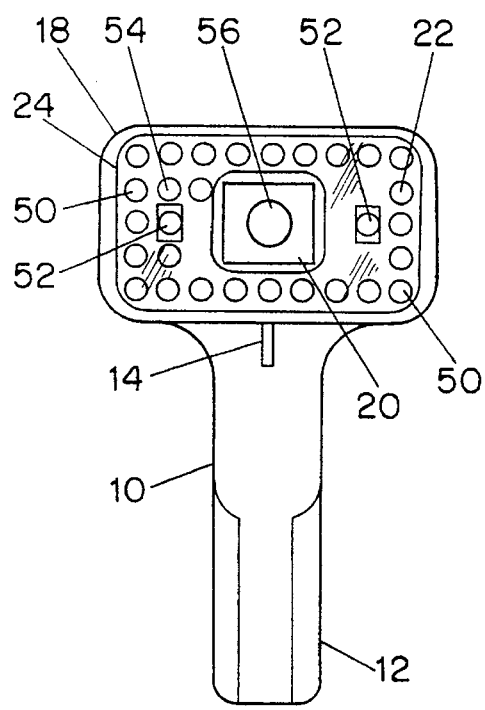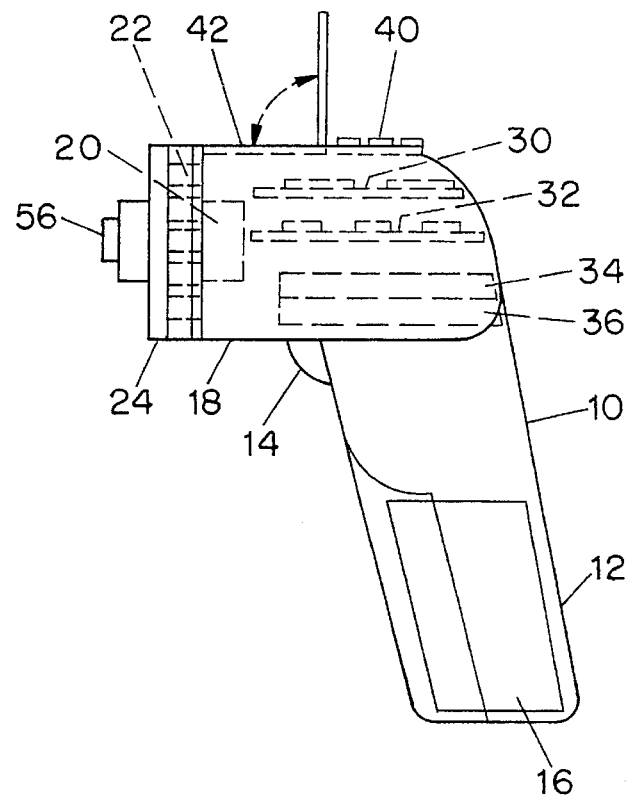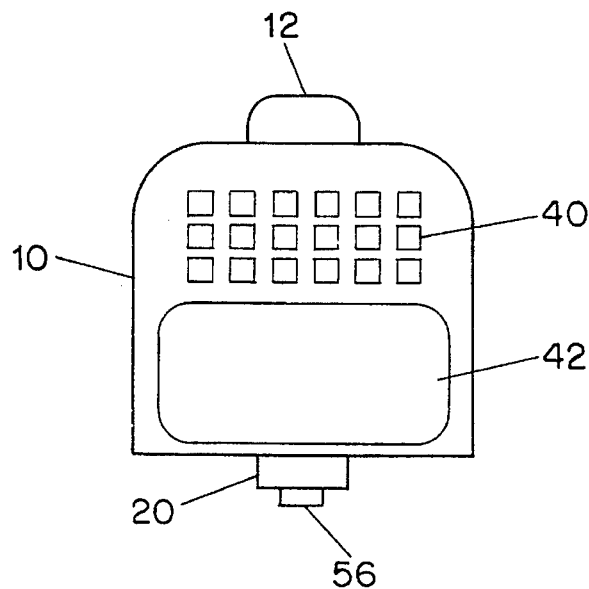
FIG. 1A
FIG. 1B
FIG. 1C

DATAFORM READERS HAVING CONTROLLED AND OVERLAPPED EXPOSURE INTEGRATION PERIODS

This is a continuation-in-part of copending application Ser. No. 08/280,489, filed Jul. 26, 1994.

This invention relates to systems and methods for reading dataforms, such as bar codes and matrix codes, and to such systems operating with overlapping exposure periods for successive lines of sensor elements of an array and having automatic exposure control implemented for successive lines or subsets of lines of sensor elements.

BACKGROUND OF THE INVENTION

While a variety of types of sensor array scanners have been provided for reading more complex forms of two dimensional bar-codes and matrix codes, these sensor array scanners are all continuous frame scanners and therefore suffer from high power consumption. Because many sensor array scanners are portable and powered by batteries, there exists a need for a portable reader with single frame capability and therefore reduced power consumption and correspondingly extended battery life. There also exists a need for a portable reader with enhanced accuracy and reliability, as well as reduced size and light weight.

In such a portable reader it is further desirable to provide for increased imaging accuracy by enabling exposure control to be accomplished on the basis of individual lines of sensor elements or successive limited subsets of lines of sensor elements of an imaging array.

BACKGROUND OF DATAFORMS

The application and use of bar codes and matrix codes are well known and growing. Bar codes and matrix codes are forms of "dataforms", which for present purposes are defined to include all arrangements whereby data is fixed in some form of machine readable copy. Thus, dataforms include one and two dimensional bar codes, matrix codes and graphic codes, as well as words and numbers and other symbols, which may be printed or etched on paper, plastic cards and metallic and other items. Dataforms may be printed in invisible ink, magnetically recorded via magnetic stripes or magnetic ink fonts, electromagnetically recorded via RF tags, engraved, stamped, tattooed (on skin), formed by ion doping (for semiconductor wafers) or biochemical binding, etc.

In the utilization of dataforms, data originally encoded is recovered for further use in a variety of ways. For example, a printed bar code may be optically scanned to derive reflectance values which are digitized, stored in buffer memory and subsequently decoded to recover the data encoded in the bar code. Regardless of the particular type of dataform, an image is typically acquired and stored as pixel values for further processing. An image of a bar code or matrix code existing as a graphic image can be acquired by use of a CCD scanner, a laser scanner or other suitable device which is capable of distinguishing between different reflective values of light reflected from a dataform. Thus, for example, a bar code typically comprises black or dark colored bar type elements printed on a white or light colored background area, with white or light colored spaces between the elements of the bar code. The spaces are typically the same color as the background area, but may be of a different light color in this example. In other examples the elements of a bar code or matrix code are white or light colored and are defined by black or darker colored spaces and background area.

In other applications, such as laser engraving on silicon wafers, illumination may result in a dark on light relationship in one orientation and a light on dark relationship in a different orientation, In addition to pixel values representing reflective values of light ("light" being defined as encompassing the entire electromagnetic spectrum for present purposes), in other arrangements pixel values representative of reflective values may be based upon reflection of sound waves or other mediums from a dataform of an appropriate configuration. In any arrangement in which a dataform is arranged to be read on the basis of reflective values, such reflective values may typically be stored as pixel values in an image buffer memory or other storage medium in bit map or other form which, while representative of pixel values for an image, may utilize any appropriate data storage format.

BACKGROUND OF SENSOR ARRAY READERS

As noted, prior arrangements for reading dataforms have been based upon laser or continuous frame CCD scanners adapted for use with two-dimensional bar codes. However, these approaches have generally been subject to one or more limitations in the quest for a practical, low power consumption, low cost, light weight hand-holdable reader providing fast and accurate reading of two-dimensional dataforms. For example, a continuous frame reader typically consumes a full watt of power because the continuous frame architecture requires that the sensor array continuously produces a stream of image data. When a microprocessor decodes a bar-code, it merely selects appropriate data to decode from the continuous stream of image data.

Full frame progressive scan CCD devices, as proposed for continuous frame transfer video or very high resolution still photograph capture, are subject to one or more of high cost, bulky configuration, high power consumption and slow gain control response time. Such factors limit applicability to practical hand-held dataform reading applications.

Objects of the present invention are, therefore, to provide new and improved dataform readers and methods avoiding one or more disadvantages of prior arrangements.

Further objects are to provide dataform readers and methods capable of providing one or more of the following:

image capture with overlapping exposure periods for successive lines of sensor elements;

automatic exposure control on a line-by-line basis;

overall low power consumption;

single frame image capture;

rapid automatic gain control;

automatic focus sensing and reading activation;

light weight hand-holdable configuration; and single chip configuration capability.

SUMMARY OF THE INVENTION

In accordance with the invention, a dataform reader to read a dataform in a target area utilizes an array of sensor elements readable to provide image signals, including a plurality of lines of sensor elements. An array control assembly is arranged to initiate exposure of a line of sensor elements by causing sensor elements of such line to be set to a reference potential in response to an exposure start signal and to cause image signals to be read from sensor elements of the line in response to an exposure stop signal and coupled to an output point.

The dataform reader also includes an exposure control system coupled to the output point and successively responsive to the level of image signals read from selected lines of sensor elements to determine an exposure period for at least one subsequent line of sensor elements based on the level of image signals from each selected line. The exposure control system is arranged to provide exposure start and stop signals to the array control assembly to implement such exposure periods in a sequence causing the exposure period for one line of sensor elements to overlap the exposure period for at least one subsequent line of sensor elements.

Also in accordance with the invention, a method, for use with a dataform reader including an array of sensor elements, includes the following steps:

(a) causing illumination of a target area including a dataform to be reflected onto the array of sensor elements by turning on illumination devices;

(b) coupling a first line of sensor elements to a reference potential in response to an exposure start signal;

(c) accumulating charge on sensor elements of the first line in an exposure period;

(d) terminating the first line exposure period by reading image signals from sensor elements of the first line, in response to an exposure stop signal;

(e) coupling the first line image signals to an output point;

(f) repeating steps (b) through (d) for successive lines of sensor elements, with step (b) for each successive line of sensor elements initiated during the step (c) exposure period for the respective preceding line of sensor elements, resulting in partially overlapping exposure periods;

(g) coupling image signals from successive lines of sensor elements to the output point in sequence following signals from the respective preceding line; and (h) terminating the reflection of illumination onto said array of sensor elements by turning off the illumination devices;

(i) coupling the image signals from the output point to a memory unit; and (j) decoding the data form in a decoder coupled to the memory unit.

The described method may additionally include the following steps between steps (e) and (f):

(x) determining an averaged level of first line image signals as coupled to the output point in step (e);

(y) utilizing the averaged image signal level to determine the timing of an exposure stop signal applied in a repetition of step (d) to terminate the exposure period of a line of sensor elements initiated after the exposure period for the first line.

For a better understanding of the invention, together with other and further objects, reference is made to the accompanying drawings and the scope of the invention will be pointed out in the accompanying claims.

BRIEF DESCRIPTION OF THE DRAWINGS

FIGS. 1A, 1B an 1C are respectively front, side and top views of a hand-held dataform reader utilizing the invention.

DESCRIPTION OF THE INVENTION

Figure 2:
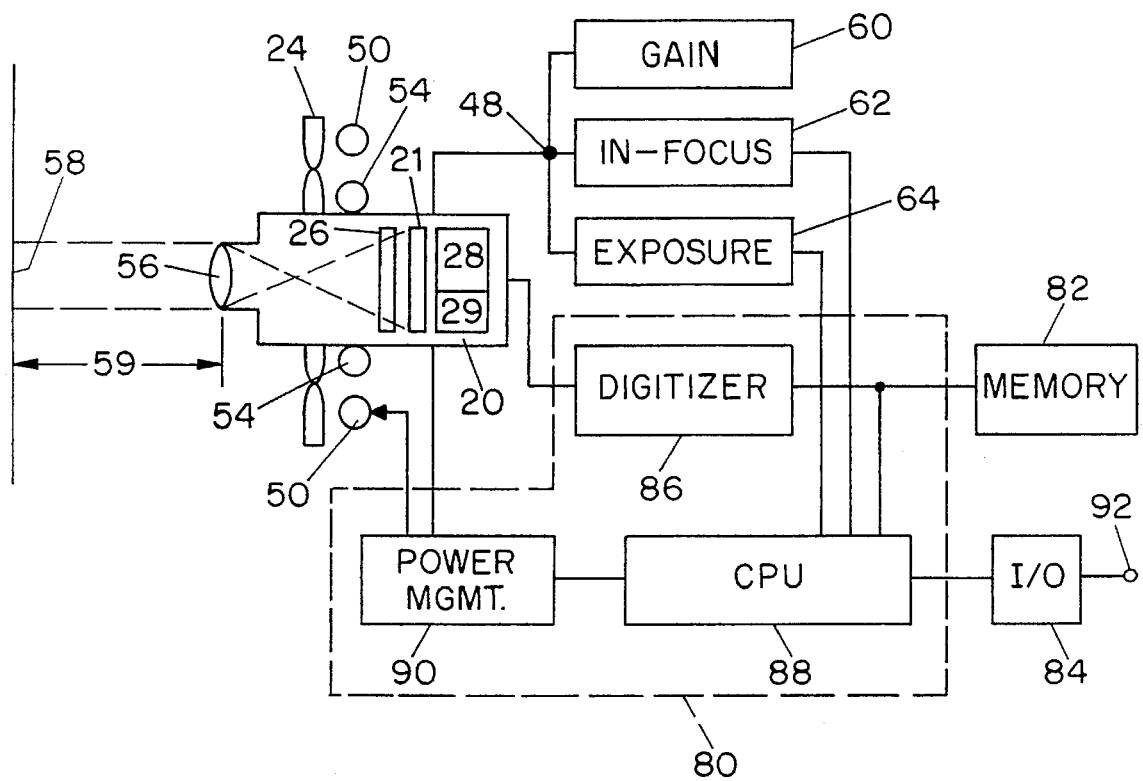
FIG. 2 is a block diagram of portions of the dataform reader with a conceptual side view of optical components of the reader.

An embodiment of a dataform reader utilizing the invention is illustrated in FIGS. 1A, B and C. FIG. 1A is a front conceptual view of the dataform reader 10 and FIGS. 1B and 1C are corresponding side and top views, respectively. A portion of the upper casing is removed in FIG. 1B to provide a simplified view of internal components. Before addressing specific aspects in accordance with the invention, it can be observed that, as shown, the reader includes a suitable impact-resistant plastic case with a hand grip portion 12, a trigger device 14 and battery compartment 16. The dataform reader also includes an upper enclosure portion 18 which, as illustrated in simplified form in FIG. 1B, may include a sensor array assembly 20, illuminator array 22 and illuminator lens 24, each of which will be described in greater detail. FIG. 1B also depicts a processor and memory unit 30 and an input/output (I/O) unit 32, which may take the form of pluggable circuit boards inserted into slots from the rear of the reader 10. Additional slots at 34 and 36 may be utilized to provide additional or extended operating capabilities by enabling insertion of PCMCIA type cards, etc. As further depicted in FIGS. 1B and 1C, the dataform reader 10 may include a data entry keyboard 40 and a display 42, represented as adjustable to different viewing angles. These and other features may be provided by skilled persons using known techniques and types of components, except that features and elements particularly relevant to implementation of the invention are provided as will be further described.

In the illustrated embodiment, there is provided an automatic exposure dataform reader 10 configured to read a dataform (such as a two-dimensional bar code) existing in a target area positioned at a distance from the dataform reader. Thus, for example a bar code can be printed on a label affixed to a package, component or letter and the dataform reader held by an operator, with the front of the reader at a distance from the bar code.

As shown in FIG. 1A, the reader 10 includes an array of illuminators with three different functions. Perimeter illuminators, such as shown at 50, are positioned in a frame type configuration and arranged to illuminate the target area with a border or frame effect which indicates the field of view of the sensor array assembly 20. Focusing illuminators, shown at 52, are arranged in this embodiment to provide angled beams of light which intersect or overlap at a predetermined distance in front of the reader. That distance represents a fixed focus distance, as will be further described. Exposure illuminators, such as shown at 54 and which typically may be included in greater numbers, are arranged to provide a relatively uniform level of target area illumination when turned on during an exposure period for the purpose of reading the dataform (e.g., capturing an image of the dataform in the sensor array). Each of the illuminators may be an appropriate form of device, such as a low cost light emitting diode (LED), arranged to provide the respective levels of illumination determined to be appropriate in applications of the invention. The number, types, arrangement and utilization of the illuminators can be determined as appropriate. Depending upon the application, the perimeter illuminators 50 or focusing illuminators 52 may be used alone or in combination to provide exposure illumination during exposure periods. The illuminator lens 24 may comprise an array configuration including a small lens portion in front of each of the illuminators 50, 52 and 54 in order to provide appropriately focused beam configurations for each of the respective functions already discussed. In the FIG. 1A view a central lens 56 is arranged to focus upon the face of the sensor array contained in assembly 20 illumination reflected from the target area and any included dataform, in order to enable the array to sense the image and provide image signals.

Referring now to FIG. 2, there is shown a simplified block diagram of portions of the dataform reader utilizing the invention. A conceptual cross-sectional view of related optical elements is included. As shown, sensor array assembly 20 projects through lens assembly 24 and the array of illuminators 50 and 54 and includes a sensor array 21, optical filter 26 and array control unit 28, with associated clock device 29. Sensor array 21 is positioned behind (to the right of, in this side view) central lens 56 and filter 26. By providing a filter 26 which is transmissive to illumination provided by the illuminators, but effective to reduce transmission in other portions of the ambient light spectrum, the effects produced by ambient light during the exposure period are reduced.

As noted, sensor array assembly 20 may include a two-dimensional array 21 of sensing cells (each utilizing a photodiode and responsive to incident reflected light). Array control unit 28 may typically include vertical and horizontal readout circuits, devices for sensing charge or voltage appearing at individual sensing cells, and an output amplifier device with adjustable gain for coupling image signals from the sensor array assembly 20, as well as clock device 29 for providing timing control of the reading of image signals from selected sensor elements. An arrangement of this type, suitable for use in the dataform reader 10, is shown and described in U.S. patent application Ser. No. 08/258,428 filed Jun. 10, 1994, and having a common assignee herewith. The content of such copending application is hereby incorporated by reference. While other types of sensor array arrangements may be utilized in implementation of the invention, an advantage in use of the type of arrangement of the referenced patent application is that the entire sensor array, plus some or all of the associated gain control, focus sensing and exposure control circuitry, may be enabled to be implemented on a single chip using known application of CMOS technology (or PMOS, NMOS, Bipolar, BiMOS, BiCMOS, or other existing or newly available technology). Use of existing CMOS technology, for example, is effective to provide significant advantages of established production techniques, single chip size, weight and cost advantages and, possibly most importantly, low power consumption (as compared to higher power requirements of prior CCD or other arrangements whereby support circuitry for the sensor array is located off chip).

In FIG. 2, the sensor array is focused, via lens 56, on target area 58 which is at a distance 59 from lens 56. The filter, 26 is placed between the lens 56 and the sensor array. Filter 26 can be specified so that it is primarily transmissive only to light in a particular portion or band of the electromagnetic spectrum and is effective to reduce transmission in other portions of the ambient light spectrum (e.g., portions differing from the transmissive band or portion). With this approach, the sensor array can be arranged to be relatively non-responsive to ambient light reflected from the target area,.

Figure 3:
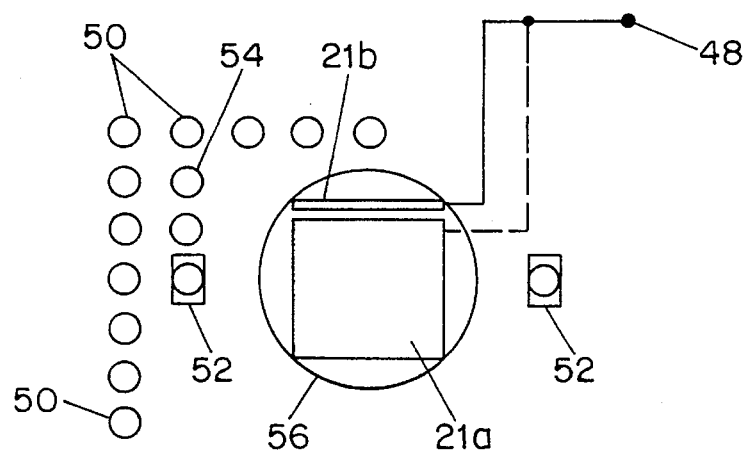
FIG. 3 illustrates details of implementations of a portion of the FIG. 2 system.

FIG. 2 also includes an in-focus sensing device 62 responsive to image signals provided from a plurality of sensor elements and arranged to provide an "in-focus" signal usable to initiate a dataform reading session. The in-focus signal is provided when an area of illumination provided by the focus illuminator or illuminators is characterized by having at least one of (a) a size within a predetermined size range, (b) a brightness within a predetermined brightness range, and (c) a location within a predetermined location range, as represented by such image signals. FIG. 3 indicates two arrangements for providing appropriate image signals to device 62. In FIG. 3, 56 represents an outline of the array focusing lens and 21a represents the outline of an array of sensing elements included in sensor array assembly 20. At 21b is indicated a linear sensor which may comprise one or two lines of sensor elements provided separately from the element array 21a. Linear array 21b is connected to point 48 of FIG. 2 under the control of array control unit 28 (not shown in the simplified representation of FIG. 3).

Figure 4:
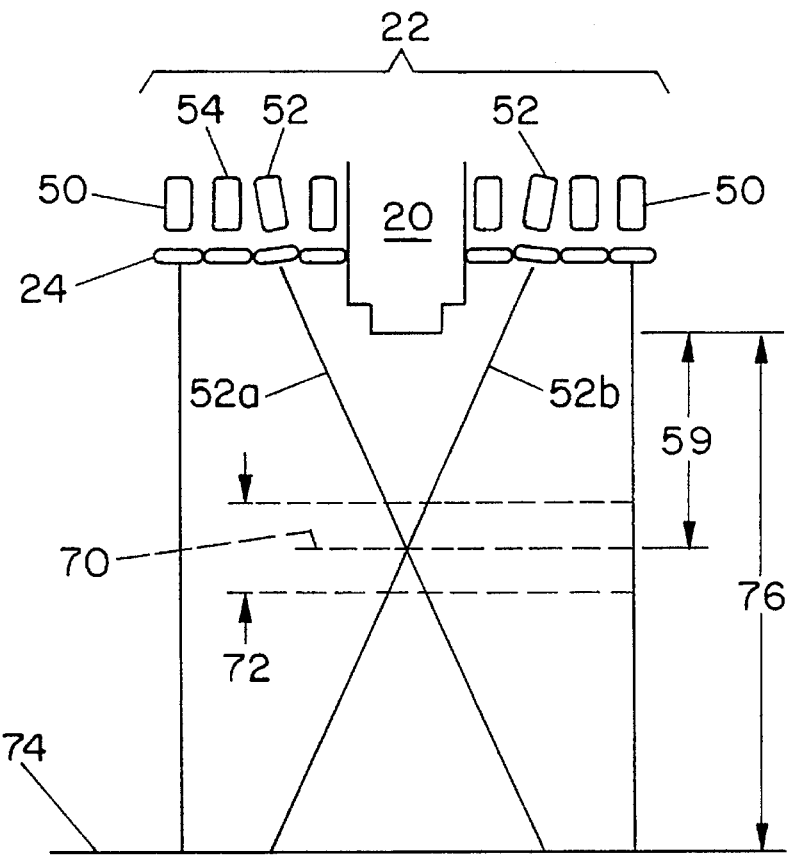
FIG. 4 is a conceptual side view illustrating aspects of an automatic focus sensing system in accordance with the invention.

FIG. 4 is a representation of focus illuminators 52 providing, via lens assembly 24, angled light beams 52a and 52b as previously discussed. As shown, these beams intersect or cross at a distance 59 from the front of the lens 56. At distance 59, there is represented a side view of the plane of focus 70 of the sensor array of array assembly 20 in combination with focusing lens 56 (see also FIG. 2).

Thus, with particular choices of a sensor array configuration and lens, the dataform reader will exhibit an in-focus condition, with an image of the target area and any included dataform accurately focused on the sensor elements of array 21, if the target area lies in the plane 70 which is at a distance 59. Further, the lens 56 can be specified so as to provide a reasonable depth of focus, with the result that an image of the target area will be acceptably focused on the sensor elements for any separation distance within the depth of focus range indicated at 72. Once the distance 59 has been determined for a particular reader design, the beam angles of illuminators 52 can be adjusted to provide beam intersection or overlap at the distance 59, as shown in FIG. 4. With this arrangement, linear sensor 21b of FIG. 3 will initially provide image signals representative of target area illumination by two spots of light located at spaced positions when the target area lies in plane 74 at a distance 76. Then, as the dataform reader is moved closer to the target area so that the target area lies in plane 70 at distance 59, the two spots of light will converge into a single brighter spot at a central location.

The image signals from linear array 21b will thus provide information representative of the single brighter spot of illumination and its location, thereby providing information indicative of the in-focus condition. By providing a degree of tolerance on the in-focus image signal indication, the in-focus indication can be adjusted to accommodate the depth of focus range 72. Upon successful distance adjustment (e.g., user movement of a hand-held reader closer or farther from the dataform image) to achieve an in-focus indication, in-focus sensing device 62 is arranged to provide an "in-focus" signal usable for initiating a reading and decoding cycle. It will be apparent that the arrangement as described also enables operation in a manual in-focus determination mode. Thus, with the operator adjusting the position of the dataform reader relative to the target area and observing the convergence of the two spots of light into a single spot, as described, an in-focus indication can be provided by operator activation of an appropriate key of keyboard 40 when convergence is achieved.

With reference to FIG. 3, the dotted connection between sensing element array 21a of assembly 20 and circuit point 48 indicates an alternative configuration. As shown in FIG. 2, point 48 provides connection to in-focus unit 62 (as well as units 60 and 64). Instead of providing additional sensing elements necessary in order to provide a dedicated linear sensor 21b , it can be arranged to make temporary use of one or more lines of elements of array 21a for focusing purposes, independently of the basic image sensing function of array 21a . With the latter arrangement, the desired in-focus determination can thus be made without the requirement to provide any separate linear sensor such as 21b.

As shown, FIG. 2 further includes an exposure control device 64 responsive to image signals from one or more selected sensor elements and arranged to provide "start" and "stop" signals usable for beginning and terminating an exposure period. Exposure control 64 utilizes the image signals to provide the stop signal in response to reflection of a predetermined level or intensity of illumination. Typically, such predetermined level or intensity will be measured within a period initiated by the start signal provided by the exposure control device and may represent an accumulated representation of the intensity of reflected light over time. By converting image signals received in the period to a voltage representative of accumulated image signal levels, and comparing that voltage to a preset threshold voltage, the stop signal can be generated when the accumulated voltage reaches the threshold voltage, representing a predetermined illumination exposure of the target area.

Figure 5:
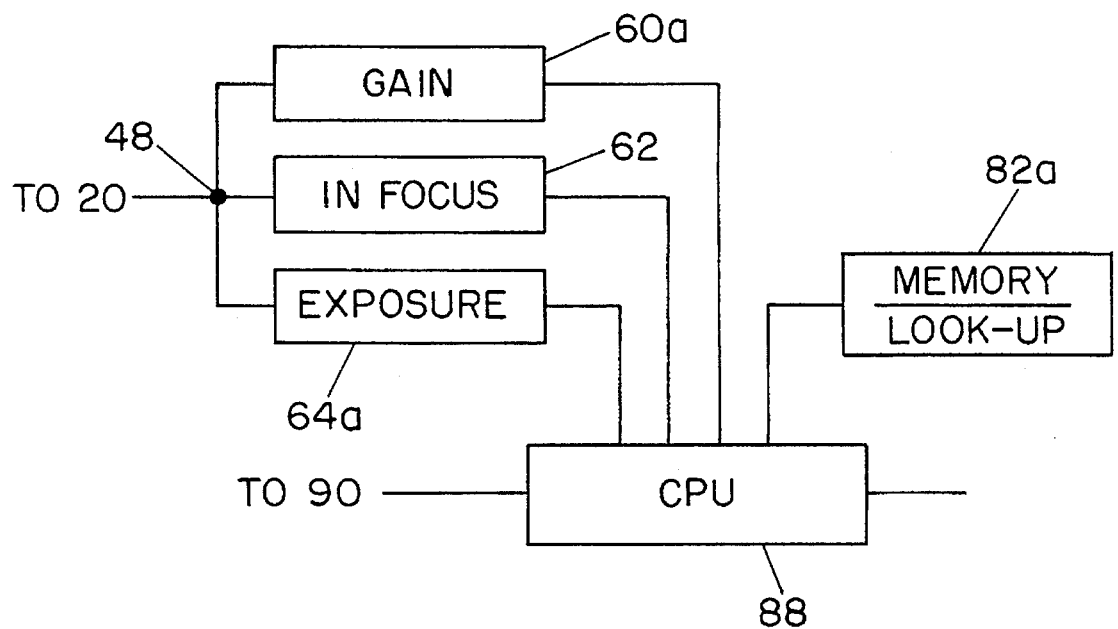
FIG. 5 is a block diagram showing a second embodiment of a portion of the FIG. 2 dataform reader.

In another embodiment illustrated in FIG. 5, the exposure control device sets the duration of the time between the start and stop signals by responding to the illumination intensity as measured by a preset fixed time period sample exposure of one or more selected sensor elements. The image signals from such sensor elements (typically, two lines of sensor elements, as discussed above) will thus be representative of the level of illumination reflected from the target area during the preset sample exposure period. By converting the image signals to a gray level signal, an exposure control signal representative of the appropriate duration of the adjustable exposure period is provided. In order to determine the actual duration of the exposure period represented by the control signal, the exposure control device 64a is coupled to the CPU 88. As shown in FIG. 5, the CPU is arranged to access a look-up table (stored in memory unit 82a) containing exposure period data correlated to gray level signal values. The actual look-up table data can be derived in advance on an empirical or other appropriate basis utilizing the level of reflected light during the preset initial period of predetermined duration as an indication of the exposure time which will be required to enable the capture of usable image data on a single frame activation basis.

As also indicated in FIG. 2, gain control device 60 is arranged to respond to image signals provided from one or more of the sensor elements of array assembly 20, and more particularly to the level of reflected light represented by such image signals, to control image signal amplification. The gain control in this embodiment is achieved by a gain control signal coupled back to the above-referenced adjustable gain output amplifier included in the sensor control unit 28. This enables the amplitude of the image signals provided by the sensor array to be maintained within a predetermined range substantially independently of reflected ambient illumination as represented by amplitude levels of selected image signals.

As illustrated in FIG. 2, this embodiment of the dataform reader in accordance with the invention also comprises a processing unit 80, memory unit 82 and input/output (I/O) module 84. Processing unit 80, which may include a digitizer 86, CPU 88 and power management module 90, receives image signals from sensor array assembly 20 and provides image data in digitized form for storage in memory unit 82. Unit 80 is responsive to the start and stop signals from units 62 and 64 to control the exposure period. As will be further described, during the operating sequence processing unit 80 is also arranged, via power management module 90 coupled to a battery (not shown), to turn on and off the perimeter, focus illuminators 50 and 52, and exposure illuminators and couple power for operation of the sensor array assembly 20. Processing unit 80 is further arranged to implement decoding of a dataform using image data stored in memory unit 82. Upon successful decoding of the dataform, unit 80 also provides an end-cycle signal effective to terminate decoding operation and also to end the reading of sensor elements to provide image signals, by terminating at least one of the coupling of input power and provision of clock signals which are both required in the reading of sensor elements under the control of array control unit 28.

Separately, decoded dataform information is provided to an output device 92, via I/O module 84. The I/O module 84 may be arranged to operate with PCMCIA cards in interface slots 34 and 36 discussed with reference to FIG. 1B, and may be arranged to provide radio, infrared, wired or other signal transmission and reception capabilities. Output device 92 may accordingly be an output port for coupling output signals via a conductor, an antenna or optical device for radio or infrared transmission, or other suitable device, with I/O unit 84 arranged to provide the decoded dataform information in suitable form for use with the particular form of output device. Modem, speech recognition, handwriting recognition, memory and other types of additional capability or peripheral cards may also be inserted in the PCMCIA slots for operation in cooperation with processing unit 80 and I/O module 84 to provide extended and further features. Items not specifically described can be provided by persons skilled in the relevant technologies.

With an understanding of the dataform reader as described, it will be apparent that for dataform reading and in other applications an imaging system provided in accordance with the invention may include automatic gain control, automatic exposure, automatic focus sensing, single frame image capture and other features as described.

OPERATION

Figure 6:
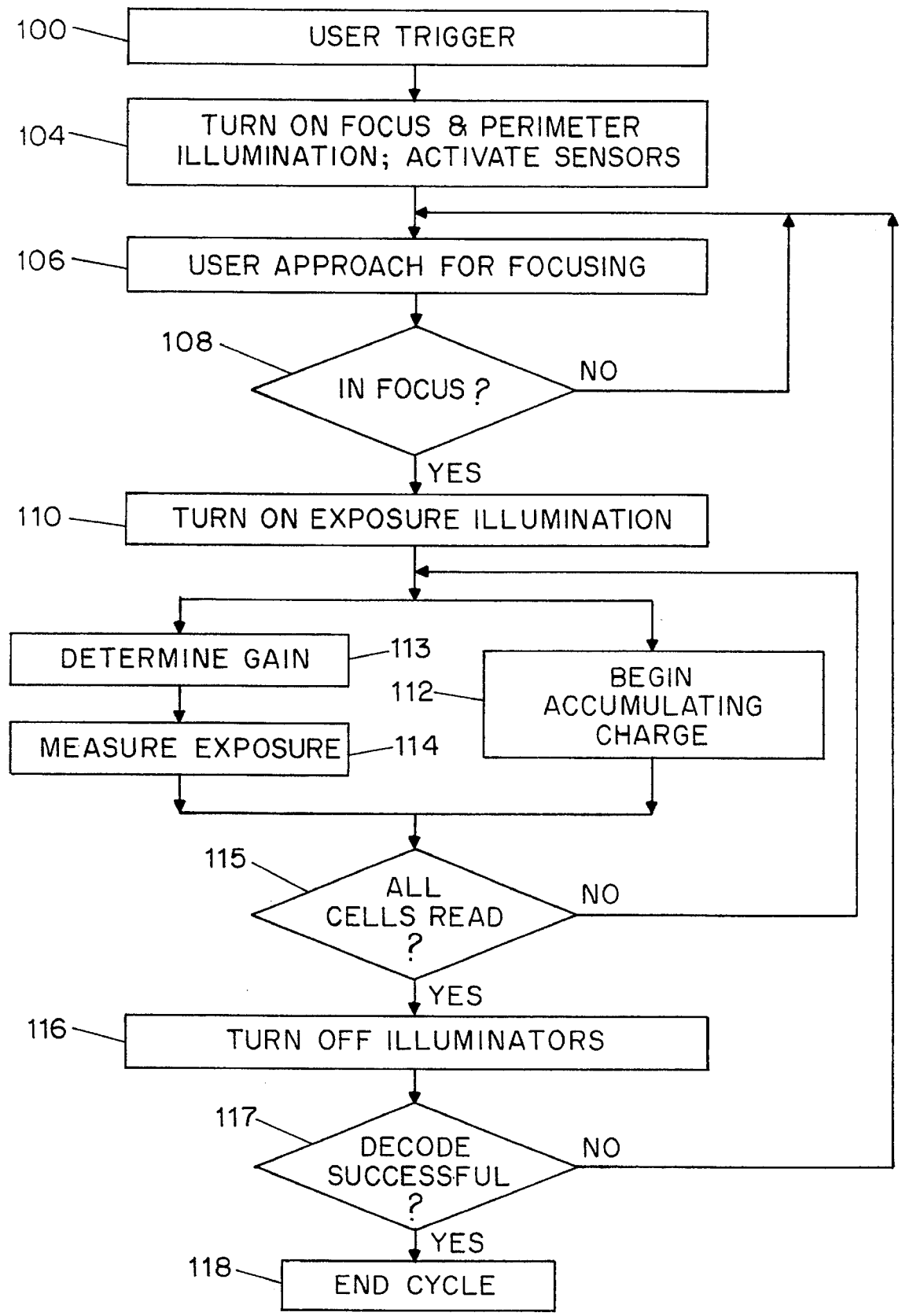
FIG. 6 is an operational flow chart useful in describing operation of the illustrated dataform reader.

With reference now to FIG. 6 there is shown an operational flow chart with reference to operation of a dataform reader utilizing the invention. At step 100, a user activates trigger device 14 of dataform reader 10 shown in FIG. 1B. At step 104, perimeter illuminators 50 and focus illuminators 52 are turned on and reading of sensor elements is initiated. At step 106, the user adjusts the distance between the dataform reader 10 and the target area to achieve a separation distance within range 72 in FIG. 4, at which point the areas of illumination intersect and merge into a single smaller, brighter area or spot of illumination having a central location. At step 108, the focus condition achieved in step 106 is monitored on the basis of image signals from a linear array of sensors indicative of whether the area of illumination is characterized by at least one of (a) a size within a predetermined size range, (b) a brightness within a predetermined brightness range, and (c) a location within a predetermined location range, or any combination of the three, as will occur as the two illumination areas, as provided on the target area by beams 52a and 52b in FIG. 4, overlap and merge. For two round spots of illumination, the spots will thus become concentric when focused and this minimum size condition can be detected in a variety of ways, including detecting the relative positions of the two spots within the field of view. When such illumination area merge is achieved as characterized, an "in-focus" signal is effective at step 110 to turn on all illuminators of the exposure array (e.g., illuminators 50 or illuminators 50 and 52, depending upon the particular configuration). As discussed, such in-focus signal can be implemented automatically or manually based on operator observation.

Upon turning on the exposure illuminators, the exposure control device sends a start signal to sensor array assembly 20 which is effective to reset any accumulated charge on the sensors to a reference charge. The photo sensors immediately begin accumulating a new charge as indicated at step 112. Simultaneously the exposure control device and the gain control device periodically measure accumulated charge on a sample of photodetectors at steps 113 and 114. The gain control device at step 113 uses sample image data to select an appropriate amplitude gain and offset signal to apply to the sensor array amplifier in array control unit 28. At step 114, the exposure control device monitors the sample image data and when the sample image data indicates that the level of reflected light from the target area, on a cumulative basis, has reached a predetermined level, the exposure control device generates a stop signal. In response to the stop signal the accumulated charge on the exposed sensor is measured and converted to a voltage signal. Known types of sensor arrays utilizing two-dimensional arrays of photosensitive cells are structured so that sensor elements are grounded to a reference charge level and then permitted to accumulate charge during an exposure period. Then, pursuant to a reading process, either all or selected cells (e.g., one half of the cells, in an interlaced configuration, or one line in a line-by-line readout arrangement) are sampled simultaneously to measure accumulated charge, with data temporarily stored and read out line-by-line sequentially using a shift register arrangement. At step 115, if no more cells require readout (e.g., all cells have been sampled simultaneously) the exposure illuminators are turned off. However, if the configuration is such that additional cells remain to be read, in this embodiment the system will return to steps 112 and 113. The exposure control device will then generate a start signal to initiate an exposure period for the next group of cells, which will be read out at the end of that exposure period. After reading a complete frame, the system will advance from step 115 to step 116 at which point the exposure illuminators are turned off.

At step 117, processor unit 80 attempts to decode the dataform utilizing image data consisting of image signals from array assembly 20 which have been digitized and stored in memory unit 82. If decoding is successful, at step 118 the decoded dataform information is made available for transmission out of the dataform reader 10 and an end-cycle signal is provided to terminate the reading cycle by turning off at least one of input power and clock signals as utilized by the array control unit 28. If the decoding is not successful, at step 117 the reading cycle is reactivated or repeated starting at step 104, as indicated in FIG. 6.

It should be noted that in step 117, if a dataform is in fact present in the captured image of the target area, it will typically be necessary to locate the dataform within the image to enable decoding. Location of the dataform image can be accomplished as described in U.S. Pat. No. 5,304,787, entitled "LOCATING 2-D BAR CODES" issued Apr. 19, 1994, and having a common assignee.

Consistent with the foregoing, a method, for use with a dataform reader including an array of sensing elements, includes all or selected ones of the following steps, particularly in application of the invention to the reading of a dataform:

(a) positioning in front of the array an optical filter transmissive to light from an exposure illuminator (described below) and effective to reduce transmission in other portions of the ambient light spectrum;

(b) initiating reading of selected sensor elements by providing input power and clock signals required for such reading;

(c) illuminating a target area with an area of illumination characterized by at least one of a size, a brightness and location which varies with the distance between the array and the target area;

(d) adjusting such distance to cause the area of illumination to be characterized by at least one of a size within a predetermined size range and a brightness within a predetermined brightness range and a location within a predetermined location range;

(e) providing an in-focus signal when an image signal from at least one sensing element indicates that the illumination is characterized as described in step (d);

(f) turning on an exposure illuminator in response to the in-focus signal;

(g) utilizing image signals from selected sensing elements, as representative of the level of reflected light, to provide a gain control signal to control the amplification of image signals from the array;

(h) providing a stop signal when image signals from at least one sensing element indicate reflection of a predetermined level of illumination from the target area;

(i) upon complete exposure of the sensor cells, turning off the exposure illuminator; and (j) processing image data, representing image signals from the array which have been digitized and stored in memory, to decode the dataform;

(k) upon successful decoding of the dataform, providing an end-cycle signal, ending sensor reading by terminating at least one of the input power and clock signals, and coupling decoded dataform information to an I/O module; and (l) if decoding is unsuccessful, repeating the method from step (d).

Figure 7:
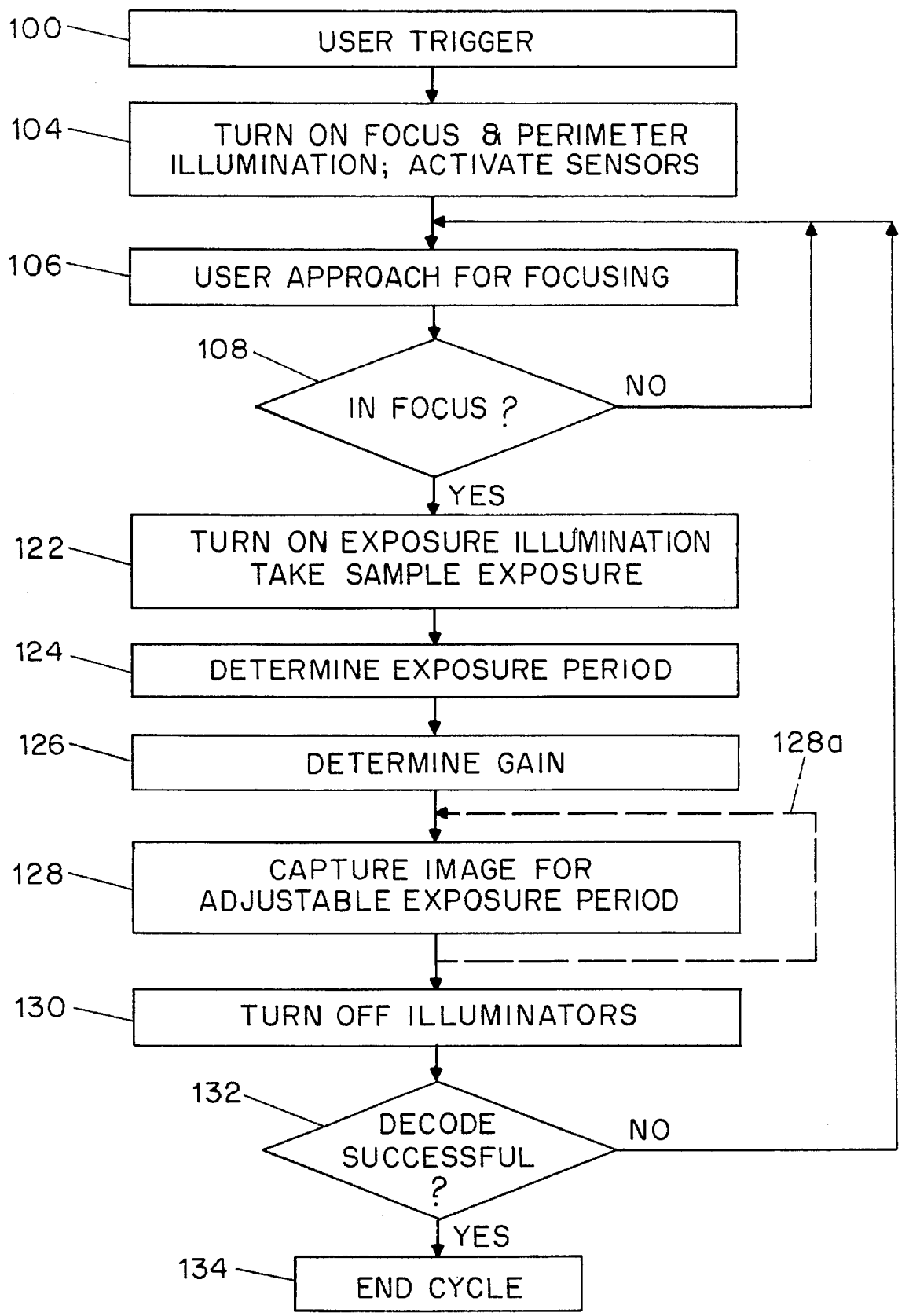
FIG. 7 is a flow chart useful in describing operation of the second embodiment of the invention.

FIG. 7 shows a flowchart corresponding to the second embodiment of this invention. Steps 100 to 108 operate the same as described in the previous embodiment. After determining the in-focus condition at 108 and generating an in-focus signal, the exposure illuminators are turned on for a preset sample exposure period and image data is collected at step 122. To do this, the exposure control device generates a sample exposure start signal whereby selected photo sensors are grounded to a reference charge and begin accumulating a sample charge. At the end of the preset exposure period, the exposure control device, a portion of which could simply be a timer for this purpose, generates a stop signal whereby the sample accumulated charge on each selected sensor is read as image data. At 124, in response to image data collected during the sample exposure, the exposure control device determines the appropriate duration of an adjustable exposure period. As discussed, the appropriate duration of the exposure period may be determined by accumulating, via exposure unit 64a of FIG. 5, image data from the selected sensors and referring a resulting voltage level to a look up table stored in memory 82a.

It will be appreciated that the level of reflected illumination will be determined by, among other possible factors, the reflectance of the target area. Such reflectance may be substantially higher or lower than an expected or typical value in certain conditions of surface texture or coloration. Accordingly, it may be desirable to control the gain of image signals from the array, as well as the exposure period. This result can be provided by accumulating, via gain unit 60a of FIG. 5, image data from selected sensor elements and referring a signal representative thereof to a look-up table in memory 82a which, for particular levels of illumination reflected during the preset initial period, provides values for adjustment of image signal output gain. With an understanding of the invention, skilled persons will be enabled to provide appropriate look-up tables utilizing empirical or other techniques. FIG. 7 thus provides step 126 for using the sample image data to determine an appropriate gain adjustment to apply to the output amplifier of the sensor array assembly.

At 128 the device captures a single frame of image data. As discussed above, if the sensor array is structured so that all photosensor cells are referenced, exposed, and sampled in parallel to generate a full frame of data, then step 128 will consist of only one cycle of grounding, exposing and sampling the accumulated charge on the cells. At step 130 the exposure illuminator is turned off. As further discussed, if the photosensor array is structured so that only selected sensor elements may be read in parallel in a single cycle, the exposure control device will generate a plurality of start and stop signals corresponding to the predetermined exposure time as indicated by dashed path 128, as appropriate to complete the reading of all cells. After collecting a full frame of data, at 130 the exposure illuminators are turned off. If the data form is successfully decoded at 132 the data transmission and termination of the reading cycle, including termination of at least one of the input power and clock signals utilized by the array control device, proceed at step 134.

Simplicity and efficiency of operation are enhanced by automatic gain control, automatic no-shutter exposure control and automatic in-focus sensing on a hand-held, user positioned basis. Operative advantages include full resolution, full frame image capture on a single frame, automatic exposure (e.g., shutter speed) basis regardless of ambient light levels. Necessary gain adjustment can be sensed in a period of the order of 100 microseconds. With single frame image capture, continuous image data transfer and data processing is avoided. In addition to hand-held applications, the simplicity, cost and reliability advantages of imaging systems in accordance with the invention are readily adapted for use in automated, fixed-position, non-attended applications for dataform reading and other imaging purposes. Additionally, the invention provides the advantage that, using available CMOS or other technology, the sensor array assembly 20 and all or major portions of units 60, 62, 64 and 80 can be fabricated on a single chip enhancing small size, light weight, ease of packaging and low power consumption (e.g., as low as one-tenth the power consumption of comparable CCD array components). This enables provision of a small, lightweight, long operating period hand-held battery operated unit suitable for reading dataforms or other image capture applications.

LINE EXPOSURE ARRANGEMENTS OF FIGS. 8 AND 9

Prior sensor array scanners focus an image of a target area onto a sensor array to simultaneously expose all or half of the sensor elements. Thus, for example, image capture may be accomplished by simultaneous exposure of all alternate lines of a sensor array followed by sequential read out on a line-by-line basis. This interlaced exposure approach is then completed by simultaneously exposing the remaining lines in a second exposure period. In each step there is one exposure period, which subjects the image capture process to a number of potential problems or shortcomings. Non-uniform image illumination or surface reflectivity can result in inclusion of image areas which are overexposed or underexposed when an exposure period is determined for the average illumination associated with an entire image. Also, the exposure period may be initiated at a given time and then continue for each line until the exposure time for that line is terminated by the image data being read out of the line of sensor elements. With this approach, as the lines are read out in sequence, the exposure time for the last line is significantly longer than for the first line. As a result the first line may be underexposed and the last line overexposed to the point of loss of image data.

Figure 8:
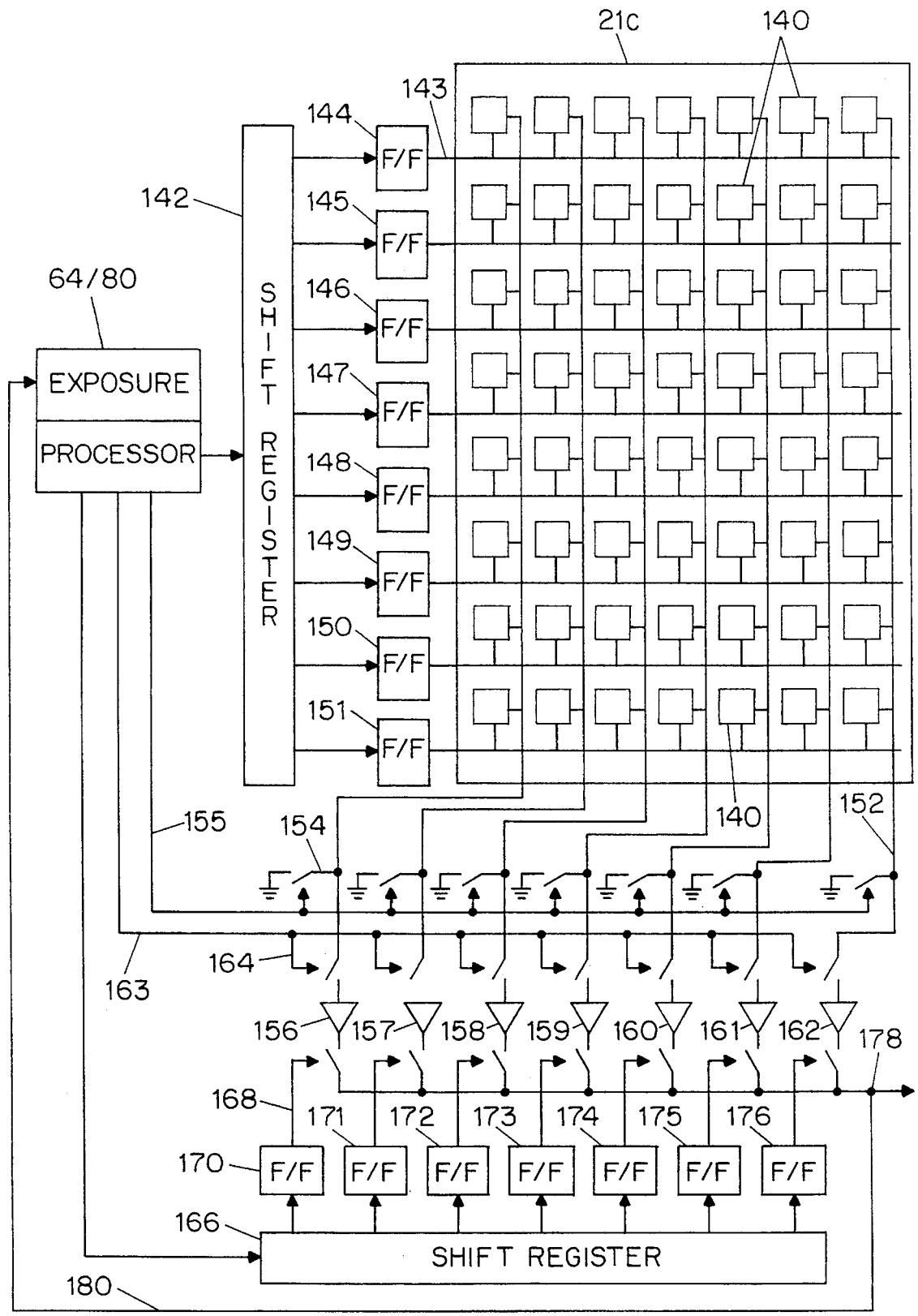
FIG. 8 illustrates, partially in block form, an embodiment of a dataform reader in accordance with the invention.

Referring now to FIG. 8, there is shown an embodiment of a dataform reader including automatic line exposure features usable in the FIG. 2 dataform reader in accordance with the invention. As illustrated, the FIG. 8 dataform reader includes an array 21c of sensor elements, indicated typically at 140, which are readable to provide image signals. As shown, the sensor elements 140 are arranged in a plurality of horizontal lines and vertical columns.

The FIG. 8 dataform reader also includes an array control assembly corresponding generally to array control unit 28 of FIG. 2. As shown, the FIG. 8 array control assembly comprises a line control shift register 142 which is coupled to successive lines of the sensor elements 140 by way of common horizontal conductors 143 connected to flip-flop units 144–151. Vertical columns of sensor elements 140 are also connected to common vertical conductors 152, which connect to grounding switches shown typically at 154 and to sample and hold amplifiers 156–162, via sensor readout switches shown typically at 168. The FIG. 8 dataform reader further includes output shift register 166 arranged to successively activate the sensor readout switches, shown typically at 168, individually connected to the flip-flop units 170–176, to cause image data stored in sample and hold amplifiers 156–162 to be successively coupled to output point 178 for successive sensor elements 140 of a selected line of the array 21c.

As illustrated, the FIG. 8 dataform reader includes an exposure control system 64/80, generally corresponding to the combination of exposure control device 64 and processing unit 80 of FIG. 2, adapted to operate as will be described with reference to FIG. 8. As shown in FIG. 8, exposure control system 64/80 is arranged to control: sensor element line selection via shift register 142; reference potential grounding of columns of sensor elements via control of switches 164; readout of image signals from a selected line of sensor elements via switches 156–162; and output of image signals from successive sensor elements of a selected line by control of shift register 166, to control activation of sensor readout switches 168 to couple image signals to output point 178. Output point 178 may typically be coupled to the input of digitizer 86 of FIG. 2, enabling the image data to be stored in memory 82 for decoding, transmission or other use. Exposure control system 64/80 is also coupled to output point 178, via conductor 180, so as to enable an averaged image signal level to be obtained from a particular line of the sensor elements 140. Such image signal level is thus made available for use in determining the exposure time for a subsequent line or subset of lines of sensor elements. Basic construction and operation of the sensor array and related portions of the FIG. 8 dataform reader are as described in the above-referenced copending application Ser. No. 08/258,428 or familiar to skilled persons, except to the extent of aspects unique to the present invention, which will be described in further detail.

Operation of the FIG. 8 dataform reader can be more fully described with reference to the FIG. 9 flow chart. At step 200 operation is initiated by a user activated trigger signal in order to read a dataform in the form of a bar code printed within a target area on a surface, for example. At 210 exposure illuminators, such as shown at 54 in FIG. 2, are turned on to illuminate the bar code within the target area.

At step 220A, exposure control system 64/80 of FIG. 8, acting by way of control signals provided to shift register 142, flip-flop 144 and grounding switches 154, couples each of the sensor elements in the first horizontal line of the elements 140 to a reference potential (e.g., to ground) in order to remove any accumulated charge on the first line of elements (e.g., photo cells). In this manner, the signal from exposure control system 64/80 which is effective to close the grounding switches 154 acts as an exposure start signal for the first line of sensor elements 140 which are connected to flip-flop 144. Thus, as illumination provided at step 210 is reflected onto the array of sensor elements, the exposure period for the first line of elements begins immediately after those elements are set to reference potential at step 220A and then begin to accumulate charge representative of the level of illumination reflected from different portions of the bar code in the target area.

At step 222A charge is accumulated on the sensor elements of the first line in an exposure period. This initial exposure period for the first line may be determined in any appropriate averaged, standardized or other manner to initiate the image data readout process. At step 224A an exposure stop signal is provided to the readout switches 164, via conductor 163, to cause each one of the sensor elements in the first line connected to flip-flop unit 144 to be coupled to a respective one of the sample and hold amplifiers 156–162. Image data is thereby simultaneously read out of all of the sensor elements of the first line, with the image data from each sensor element respectively held in one of the amplifiers 156–162. The exposure period for each sensor element of the first line is thus initiated by the exposure start signal causing the elements to be grounded and simultaneously terminated when exposure stop signal causes the elements to be read into the sample and hold amplifiers.

At step 226A shift register 166 is activated to control flip-flop units 170–176 which sequentially actuate the switches 168 to cause a signal comprising a sequence of data representative of the level of image signals read from the individual sensor elements of the first line to be coupled to output point 178.

Figure 9:
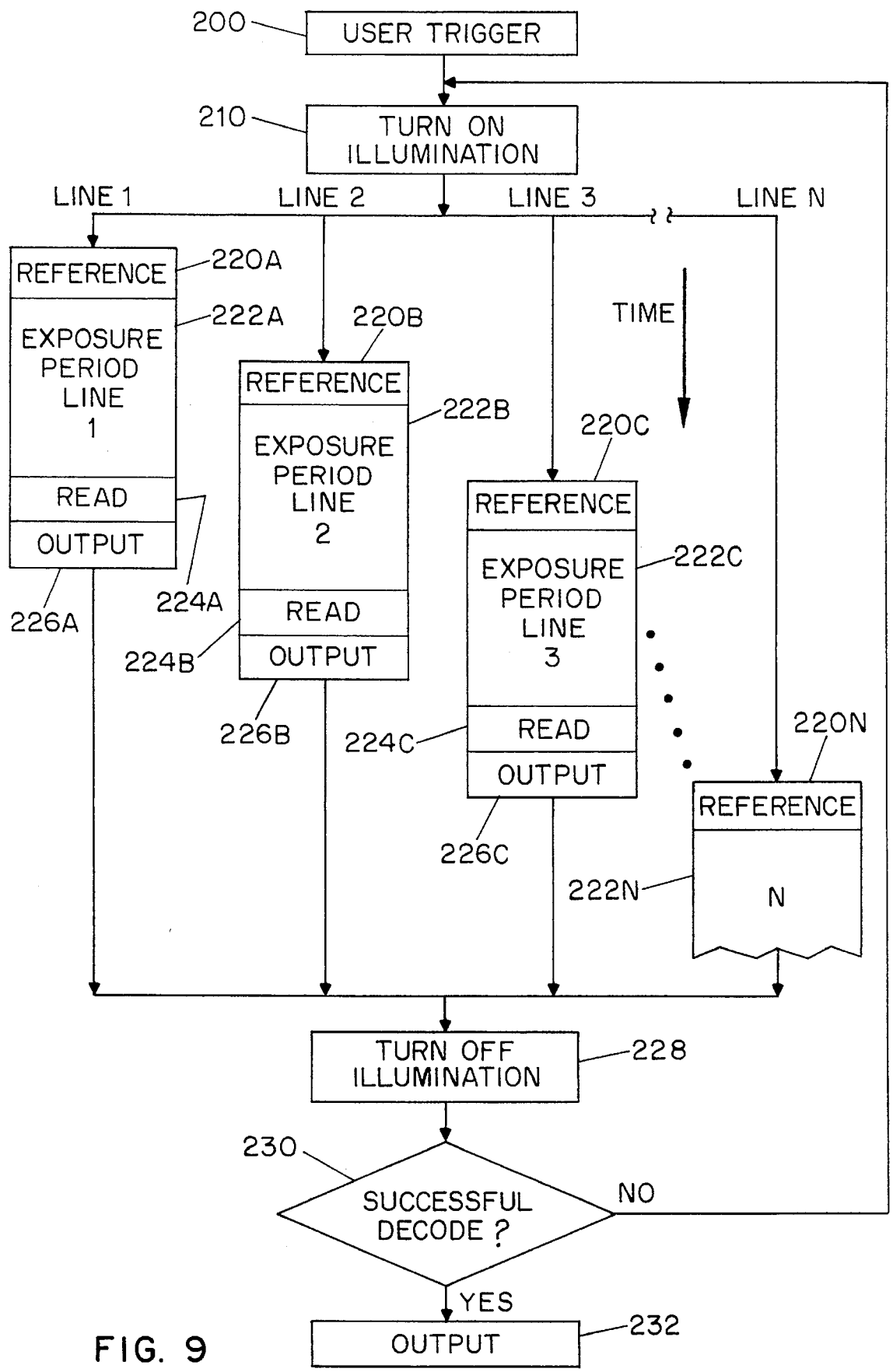
FIG. 9 is a flow chart useful in describing operation of the FIG. 8 dataform reader.

The same series of steps, denoted at 220B, 222B, 224B and 226B in FIG. 9, are carried out for the second line of sensor elements. As represented in FIG. 9, because the exposure period required to appropriately expose a line of cells is longer than the time required to sample the cells to read the image data and output the data to output point 178, the controlled exposure period for the next line of sensor elements is initiated during the preceding exposure period. Thus, with the passage of time represented in a downward direction in FIG. 9, it will be seen that the exposure periods 222A, 222B and 222C for the first three lines of sensor elements begin on a successive time-stepped sequence so that the exposure period 222B overlaps the exposure period 222A for the preceding line of sensor elements in this example. FIG. 9 is provided for illustrative purposes and actual timing relationships may be different than those shown. The timing is controlled so that the first, second and third lines are read and the resulting image coupled to output 178 in succession, so as to produce a stream of image data. In this way, image data for each successive sensor element of the second line follows the corresponding image data for the first line, etc., without interference. This is accomplished under the control of a sequence of exposure periods determined by exposure start and stop signals provided for each line of sensor elements, respectively by the exposure control system 64/80. The sequence of overlapping time controlled exposure periods for successive lines continues until all lines have been exposed, read and image data coupled to output point 178, as represented by corresponding steps 220N, 222N, etc. implemented for the last, or bottom line, denoted line N.

At step 228 the exposure illumination is turned off. At 230 the dataform reader checks for a successful decoding of the bar code present in the target area in this example. If the bar code has been successfully decoded the decoded data is provided, at step 232, to the FIG. 2 output port 92. If the decoding is found to have been unsuccessful in providing the level of decoded data desired, at step 230 the operation is returned to step 210 and the illumination is turned on for an iteration of the process.

With an understanding of the basic exposure and reading process, attention is again directed to the dataform reader as shown in FIG. 8. Assume the first line of sensor elements has been exposed, read and the resulting image data coupled to output point 178 for coupling to digitizer 86 of FIG. 2 for further processing and use. As shown, a representation of the first line image data is also coupled to the exposure control system 64/80, via conductor 180. By monitoring the level of such image data representative of the first line, an appropriate exposure period can be determined for a subsequent line and used for determining the exposure start and stop periods for that subsequent line. For example, since the FIG. 9 illustration shows the third line exposure period 222C beginning after the step 226A output from the first line, exposure information derived from the first line image signal level can be used for controlling the exposure period used for the third line. Alternatively, instead of independently determining the exposure period for each successive line individually, the exposure information derived from the first line image signal level can be used for controlling the exposure period for a subsequent subset of lines, for example the third, fourth and fifth lines. This line subset approach provides exposure period accuracy between that provided by a single full image (or interleaved image) exposure period and the higher accuracy possible by use of an exposure period determined for each subsequent line individually. Development of the exposure information can be carried out by averaging the level of image data for a plurality of sensor elements of a given line and utilizing a look-up table arrangement, as discussed with reference to FIG. 5, to determine the actual duration of an appropriate exposure period for a subsequent line, or subset of lines, of sensor elements. In utilizing such an exposure period for exposure of a subset of three lines, for example, each line can be grounded in series and read out in series successively, using the same exposure period as determined from the level of the first line image data.

Addressing the operation of the FIG. 8 arrangement more particularly, exposure control system 64/80 is effective to send control signals to line control shift register 142 to determine which line (e.g., the horizontal line of sensor elements coupled to flip-flop unit 144) should have the voltage driven high and which lines (e.g., all remaining lines of sensor elements) should have the voltage driven low. Under control of the shift register 142, the respective flip-flop units 144–151 drive the sensor element line voltages appropriately. When a line is driven high, the charge accumulated on each sensor element in that line is transferred to the respective one of the vertical conductors 152 connected to that sensor element. When a horizontal line is driven high, the exposure control system 64/80 also sends a signal to either the grounding switches 154 or the readout switches 164. In the first case, the charge transferred to each respective vertical conductor 152 is grounded. In the latter case, each sensor element of the selected line is read by having charge from it coupled to the respective one of the sample and hold amplifiers 156–162, so that a representation of image data on each sensor element is saved in the amplifiers 156–162 as a voltage level for later output coupling.

At the beginning of an exposure period a selected line is driven high and the grounding switches 154 are closed in response to an exposure start signal provided via conductor 155, in order to initiate a line exposure period. At the end of the exposure period, the line is driven high and the readout switches 164 to the sample and hold amplifiers 156–162 are closed by an exposure stop signal provided via conductor 163. After a line of image data is collected in the sample and hold amplifiers, the exposure control system 64/80 causes the image data read from each sensor element to be sequentially coupled to the output point 178. This is accomplished by control signals sent to readout shift register 166, which controls flip-flop units 170–176. The flip-flop units each connect to one of the output switches 168, so that the image data held in each of amplifiers 156–162 can be coupled sequentially to output point 178. In this manner, with appropriate timing, image data from each sensor element in a horizontal line and from successive lines of elements can be coupled to output point 178 on a continuous sequential basis to provide image data representative of a complete frame. From output point 178 the image data is provided for further processing as previously discussed and also provided as an input to exposure control system 64/80 for use in determining exposure periods and providing appropriate exposure start and stop signals.

Pursuant to the foregoing, a method, for use with a dataform reader including X lines of sensor elements arranged in an array, may desirably include the following steps:

(a) reading image signals from sensor elements of a selected line of sensor elements;

(b) utilizing the level of image signals read in step (a) to determine an exposure period;

(c) utilizing such exposure period to control the duration of exposure to illumination reflected from a target area onto a first subset of Y lines of sensor elements, where Y is at least one and less than X; and (d) repeating steps (a) through (c) substituting in step (a) image signals from a line subsequent to said selected line, and in step (c) utilizing the exposure period to control the duration of exposure of a second subset of Y lines subsequent to the first subset of Y lines.

For example, with Y equal to three, each line of sensor elements of a subset of three lines can be exposed for an identical exposure period determined on the basis of the level of image signals read from an earlier selected line of sensor elements. Also, where Y equals one, each subset of one line of sensor elements can be exposed for an exposure period determined on the basis of the level of image signals read from an earlier selected line of sensor elements, so that the exposure period for each line is independently determined.

While there have been described the currently preferred embodiments of the invention, those skilled in the art will recognize that other and further modifications may be made without departing from the invention and it is intended to claim all modifications and variations as fall within the scope of the invention.

What is claimed is:

1. A dataform reader comprising:

an array of sensor elements readable to provide image signals, including a plurality of lines of sensor elements;

an array control assembly coupled to said array and arranged to initiate exposure of a line of sensor elements by causing sensor elements of said line to be set to a reference potential in response to an exposure start signal, and to cause image signals to be read from sensor elements of said line in response to an exposure stop signal and coupled to an output point; and an exposure control system coupled to said output point and successively responsive to the level of image signals read from selected lines of sensor elements to determine an exposure period for at least one subsequent line of sensor elements based on the level of image signals from each said selected line, and arranged to provide said exposure start and stop signals to said array control assembly to implement said exposure periods in a sequence causing the exposure period for one line of sensor elements to overlap the exposure period for at least one subsequent line of sensor elements.

2. A dataform reader as in claim 1, wherein said array control assembly is arranged to cause individual image signals from complete lines of sensor elements to be sequentially read and coupled to said output point in response to an exposure stop signal.

3. A dataform reader as in claim 1, wherein said exposure control system is arranged to utilize the image signals from a plurality of sensor elements of a selected line of said array to develop an average image signal level which is usable for determining an exposure period for one of the following: a single subsequent line of sensor elements, a plurality of successive lines of sensor elements.

4. A dataform reader as in claim 3, additionally comprising a memory unit storing a look-up table of line exposure periods versus average image signal levels.

5. A dataform reader as in claim 1, wherein said array control assembly causes a line of sensor elements to be set to a reference potential by being coupled to a ground reference potential.

6. A dataform reader as in claim 1, wherein said exposure control system provides said start signals to said array control unit for successive lines of sensor elements at predetermined uniform time intervals.

7. A dataform reader as in claim 1, wherein said array control assembly comprises a line control shift register unit enabling individual element sensor lines of said array to be selected for one of reading and coupling to said reference potential, and a readout shift register unit enabling individual element sensors to be selected for coupling of image values to said output point.

8. A dataform reader as in claim 7, additionally comprising a plurality of sample and hold amplifiers, each usable between one column of sensor elements of said array and said output point.

9. A dataform reader as in claim 8, additionally comprising a plurality of output switches controlled by said readout shift register, one coupled between each of said sample and hold amplifiers and said output point.

10. A dataform reader as in claim 1, wherein each of said sensor elements is a light sensitive diode element formed on a CMOS chip.

11. A dataform reader as in claim 1, additionally comprising:
- a memory unit coupled to said output point and arranged to store image data representative of said image signals; and
- a processing unit coupled to said memory unit and arranged to process said stored image data to decode a dataform represented by said image signals.

12. A dataform reader comprising:
- an array of sensor elements readable to provide image signals, including a plurality of lines of sensor elements;
- an array control assembly arranged to initiate exposure of a line of sensor elements by causing sensor elements of said line to be set to a reference potential in response to an exposure start signal and to cause image signals to be read from sensor elements of said line in response to an exposure stop signal and coupled to an output point; and
- an exposure control system coupled to said output point and successively responsive to the level of image signals read from selected lines of sensor elements to determine an exposure period for at least one subsequent line of sensor elements based on the level of image signals from each said selected line, and arranged to provide said exposure start and stop signals to said array control assembly to implement said exposure periods for lines of sensor elements.

13. A dataform reader as in claim 12, wherein said exposure control system is arranged to utilize the image signals from a plurality of sensor elements of a selected line of said array to develop an average image signal level which is usable for determining an exposure period for one of the following: a single subsequent line of sensor elements, a plurality of successive lines of sensor elements.

14. A dataform reader as in claim 13, additionally comprising a memory unit storing a look-up table of line exposure periods versus average image signal levels.

15. A dataform reader as in claim 12, wherein said exposure control system provides said start signals to said array control unit for successive lines of sensor elements at predetermined uniform time intervals.

16. A dataform reader as in claim 12, wherein each of said sensor elements is a light sensitive diode element formed on a CMOS chip.

17. A dataform reader, usable to read a dataform in a target area at a distance from said reader comprising:

- an array of sensor elements readable to provide image signals, including a plurality of lines of sensor elements;
- at least one exposure illuminator arranged to illuminate said target area;
- a focusing device positioned in front of said array and arranged to focus on said array illumination reflected from at least a portion of said dataform when said distance is within a focus range;
- an array control assembly coupled to said array and arranged to initiate exposure of a line of sensor elements by causing sensor elements of said line to be set to a reference potential in response to an exposure start signal and to cause image signals to be read from sensor elements of said line in response to an exposure stop signal and coupled to an output point;
- an exposure control system coupled to said array control assembly and arranged to provide said exposure start and stop signals to said array control assembly to implement said exposure periods in a sequence causing the exposure period for one line of sensor elements to overlap the exposure period for at least one subsequent line of sensor elements; and
- a processing unit coupled to said output point and arranged to process said image signals to decode said dataform.

18. A dataform reader as in claim 17, wherein said exposure control system provides said start signals to said array control unit for successive lines of sensor elements at predetermined uniform time intervals.

19. A dataform reader as in claim 17, wherein said array control assembly comprises a line control shift register unit enabling individual element sensor lines of said array to be selected for one of reading and coupling to said reference potential, and a readout shift register unit enabling individual element sensors to be selected for coupling of image values to said output point.

20. A dataform reader as in claim 19, additionally comprising a plurality of sample and hold amplifiers, each usable between one column of sensor elements of said array and said output point.

21. A dataform reader as in claim 17, wherein each of said sensor elements is a light sensitive diode element formed on a CMOS chip.

22. A dataform reader as in claim 17, additionally comprising a memory unit coupled between said output point and said processing unit and arranged to store image data representative of said image signals.

23. A method, for use with a dataform reader including an array of sensor elements, comprising the following steps:
(a) causing illumination of a target area including a dataform image to be reflected onto said array of sensor elements;
(b) coupling a first line of sensor elements to a reference potential in response to an exposure start signal;
(c) accumulating charge on sensor elements of said first line in an exposure period;
(d) terminating said first line exposure period by reading image signals from sensor elements of said first line in response to an exposure stop signal;
(e) coupling said first line image signals to an output point;
(f) repeating steps (b) through (d) for successive lines of sensor elements, with step (b) for each successive line of sensor elements initiated during the step (c) exposure period for the respective preceding line of sensor elements, resulting in partially overlapping exposure periods;

(g) coupling image signals from successive lines of sensor elements to said output point in sequence following image signals from the respective preceding line; and (h) terminating said reflection of illumination onto said array of sensor elements.

24. A method as in claim 23, wherein step (a) includes turning on illumination of said target area to provide reflected illumination and step (h) includes turning off said illumination after image signals have been read from all lines of sensor elements of said array.

25. A method as in claim 23, additionally including the following steps between steps (e) and (f):

(x) determining an averaged level of first line image signals as coupled to said output point in step (e);

(y) utilizing said averaged image signal level to determine the timing of an exposure stop signal applied in a repetition of step (d) to terminate the exposure period for at least one line of sensor elements subsequent to said first line.

26. A method as in claim 25, wherein step (y) includes using a look-up table to determine the timing of said exposure stop signal based upon said averaged image signal level.

27. A method as in claim 25, wherein in step (y) said averaged image signal is used to determine the timing of an exposure stop signal applied to terminate the exposure period of a subsequent line of sensor elements at least one line removed from the line whose image signal level is averaged in step (x).

28. A method as in claim 23, additionally including the steps of:

(i) coupling said image signals from said output point to a memory unit; and (j) decoding said dataform in a decoder coupled to said memory unit.

29. A method, for use with a dataform reader including X lines of sensor elements arranged in an array, comprising the following steps:

(a) reading image signals from sensor elements of a selected line of sensor elements, said image signals including image signals representative of at least a portion of a dataform;

(b) utilizing the level of image signals read in step (a) to determine an exposure period;

(c) utilizing said exposure period to control the duration of exposure to illumination reflected from a target area onto a first subset of Y lines of sensor elements, where Y is at least one and less than X; and (d) repeating steps (a) through (c) substituting in step (a) image signals from a line subsequent to said selected line, and in step (c) utilizing said exposure period to control the duration of exposure of a second subset of Y lines subsequent to said first subset of Y lines.

30. A method as in claim 29, wherein the exposure period determined in step (b) is utilized in step (c) as the exposure period for each of a plurality of lines comprising a subset of Y lines, each line being individually exposed for said exposure period.

31. A method as in claim 30, wherein Y equals three, each line of sensor elements of a subset of three lines being exposed for an exposure period determined on the basis of the level of image signals read from a selected earlier line of sensor elements.

32. A method as in claim 29, wherein Y equals one, each subset of one line of sensor elements being exposed for an exposure period determined on the basis of the level of image signals read from a selected earlier line of sensor elements.

33. A method as in claim 29, wherein step (b) includes using a look-up table to determine said exposure period based upon an averaged value of the level of image signals read in step (a).

34. A method as in claim 29, wherein in step (c) said exposure period is utilized to determine the timing of an exposure stop signal effective to cause image signals to be read from a line of sensor elements, relative to a prior exposure start signal effective to cause said line of sensor elements to be coupled to a reference potential to start the exposure period.

35. A method as in claim 29, additionally comprising the step of utilizing said image signals to decode said dataform.

* * * * *